United States Patent

Toyosawa et al.

[11] Patent Number: 6,021,182
[45] Date of Patent: Feb. 1, 2000

[54] METHOD AND SYSTEM FOR INCREASING THE EFFICIENCY WITH WHICH CONNECTIONS ARE MADE ACROSS A COMMUNICATION LINE

[75] Inventors: Haruhiko Toyosawa, Satte; Kenji Sugimoto, Yokohama, both of Japan

[73] Assignee: International Business Machines Corporation, Armonk, N.Y.

[21] Appl. No.: 08/845,797

[22] Filed: Apr. 25, 1997

[30] Foreign Application Priority Data

Apr. 26, 1996 [JP] Japan ................................. 8-106904

[51] Int. Cl.[7] .................................................. H04M 11/00
[52] U.S. Cl. .................................... 379/90.01; 379/93.04; 379/100.12
[58] Field of Search ......................... 379/93.01, 93.04, 379/93.07, 100.12, 100.14, 90.01

[56] References Cited

U.S. PATENT DOCUMENTS

| | | | |
|---|---|---|---|
| 4,825,461 | 4/1989 | Kurita et al. ........................ | 379/93.07 |
| 5,311,574 | 5/1994 | Livanos .................................... | 379/214 |
| 5,473,671 | 12/1995 | Partridge, III ......................... | 379/88.2 |
| 5,600,704 | 2/1997 | Ahlberg et al. ......................... | 379/201 |
| 5,655,079 | 8/1997 | Hirasawa et al. .................. | 395/200.75 |
| 5,760,917 | 6/1998 | Sheridan ................................. | 358/442 |

*Primary Examiner*—Curtis A. Kuntz
*Assistant Examiner*—Melur Ramakrishnaiah
*Attorney, Agent, or Firm*—Jeanine S. Ray-Yarletts; Andrew J. Dillon

[57] ABSTRACT

A method and system are provided within a communication system to quickly make a connection with an access point by using a simple operation. When a communication terminal, such as a personal computer (PC) that has a communication function, is to access a communication network, one of the access points that is the most accessible is selected based on access experience data acquired from past access processing, and the connection at the access point is performed.

9 Claims, 3 Drawing Sheets

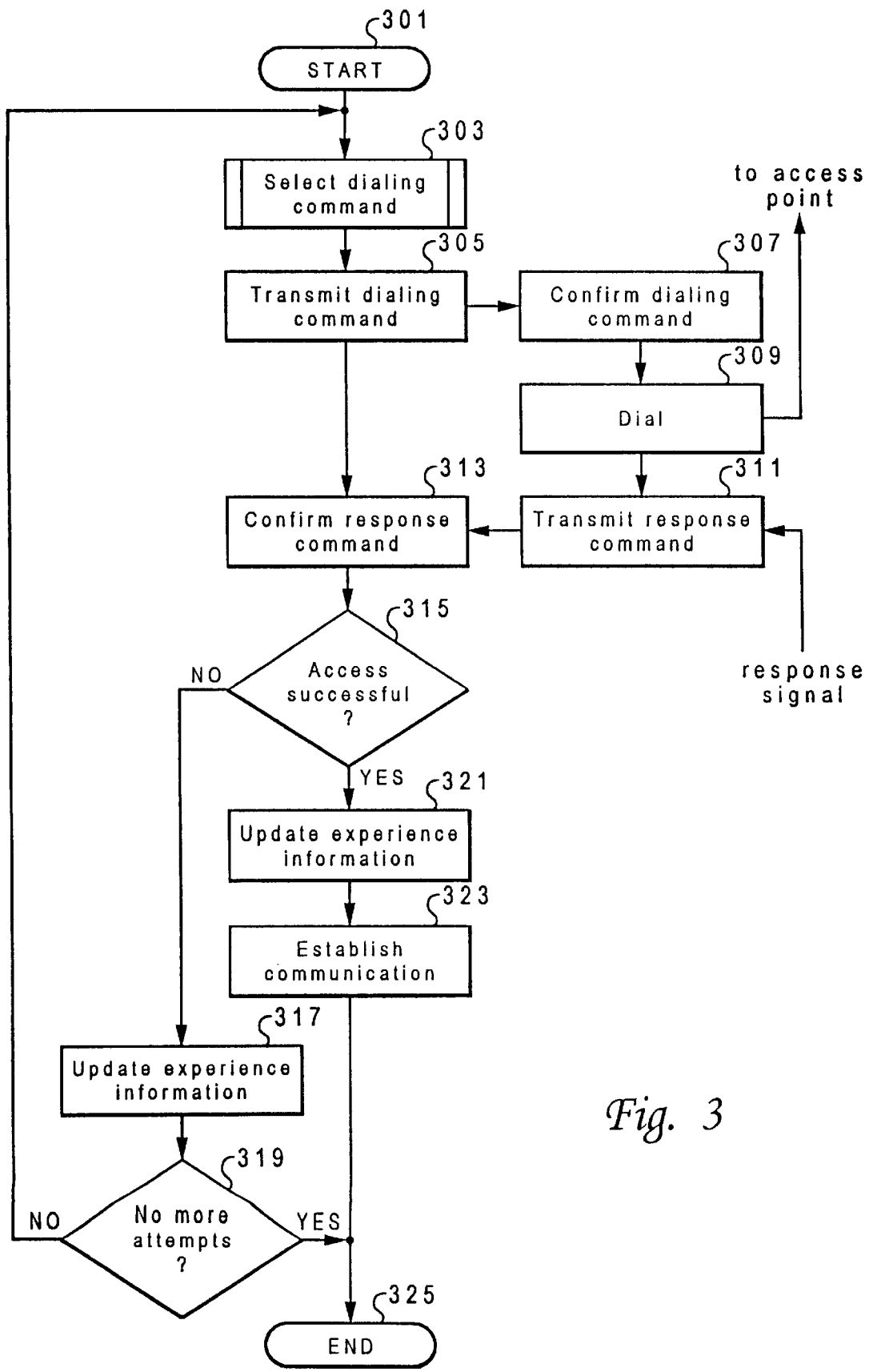

METHOD AND SYSTEM FOR INCREASING THE EFFICIENCY WITH WHICH CONNECTIONS ARE MADE ACROSS A COMMUNICATION LINE

BACKGROUND OF THE INVENTION

1. Technical Field

The present invention relates in general to communication connections that are performed across a communication line and, in particular, to increasing the efficiency with which communication connections are made across communication lines.

2. Description of the Related Art

Conventionally, when a user is trying to connect a personal computer (PC) to a communication network, if the user's attempt to access the network at an access point on the communication network is unsuccessful, he or she will either waits for awhile and again tries to make connection at the same access point, or designates a replacement access point and tries to make a connection there. Various systems by which to make such a connection have been proposed. They can be roughly classified as follows:

(a) Auto-Redialing Method

An example redialing method is one whereby, when an attempt to make a connection using a registered dialing number fails, another attempt to make the connection is made using the same registered dialing number. Concerning this, disclosed in Japanese Unexamined Patent Publication No. Hei 6-233005 is a method by which a dialing command will be disregarded when the interval at which it is issued violates the rule that, to access the dialed line, the number of auto-redials that are made in three minutes shall be two or fewer, except in an emergency, such as when there is a fire or a burglary. For connection to another access point using the above-described auto-redialing method, the designation of a replacement access point is required.

(b) Dialing Method Involving the Alternate Use of a Dialing Number and a Replacement Dialing Number According to this method, initially, a first (main) and a second (sub) address to be accessed are registered, and then an attempt to make a connection is made using the first address. If the attempt fails, an access attempt is then made using the second address. With this method, however, even though there is less probability that an access attempt using the first address will be successful than there is that one using the second address will be, the access attempt using the first address must be performed. As a result, a fast connection is not made, and the unnecessary transmission of a number to be dialed causes a busy condition at a telephone exchange.

SUMMARY OF THE INVENTION

It is therefore one object of the present invention to provide a method whereby it is possible to quickly make a connection with an access point by using a simple operation.

It is another object of the present invention to provide a system whereby the load on a telephone exchange can be lessened by reducing the number of dialing attempts that are required to effect a connection across a public telephone network.

According to the present invention, when a communication terminal, such as a personal computer (PC) that has a communication function, is to access a communication network, the most accessable one of the access points is selected based on access experience data that are acquired from past access processing, and the connection at the access point is performed.

According to one aspect of the present invention, a method that is performed by a communication terminal that includes a communication terminal main body, in which is stored address information for a plurality of access points and which generates dialing commands for making connections to the plurality of access points, and a modem having a dialing transmission function, comprises the steps of: holding, in the communication terminal main body, a plurality of access experience information items corresponding to a plurality of access points; employing the plurality of access experience information items at the communication terminal main body to select an access point that is currently assumed to be that one which is most accessible; generating, in the communication terminal main body, a dialing command from address information for the selected access point, and transmitting the dialing command to the modem; receiving the dial command at the modem; dialing, by means of the modem, for the selected access point; generating a response command at the modem upon receipt of a response signal from the selected access point, and transmitting the response command to the communication terminal main body; receiving the response command at the communication terminal main body; determining, by a function performed at the communication terminal main body based on the response command, whether or not an attempt to connect to the selected access point is successful; employing, when the attempt to connect to the selected access point is successful, the response command at the communication terminal main body to update an access experience information item, from among the plurality of stored access experience information items, that corresponds to the selected access point; establishing communication with the selected access point; employing, when the attempt to connect to the selected access point is not successful, the response command at the communication terminal main body to update an access experience information item, from among the plurality of stored access experience information items, that corresponds to the selected access point; employing, at the communication terminal main body, the updated access experience information to again select an access point that is currently assumed to be that one which is most accessible; and attempting to again make a connection with the re-selected access point.

According to another aspect of the present invention, a method that is performed by a communication terminal, which has a function for storing address information for a plurality of access points, for generating access commands to access the plurality of access points and for transmitting the access commands to a modem, and which has a function for receiving from the modem a response command that indicates whether or not a connection that corresponds to the access commands is successful, comprises the steps of: storing a plurality of access experience information items corresponding to a plurality of access points; employing the plurality of access experience information items to select an access point currently assumed to be that one which is most accessible; generating dialing command from address information for the selected access point and transmitting the dialing command to the modem; receiving a response command from the modem; determining, based on the response command, whether or not an attempt to connect to the selected access point is successful; employing, when the attempt to connect to the selected access point is successful, at the communication terminal main body the response command to update an access experience information item, from among the plurality of access experience information items, that corresponds to the selected access point; establishing communication with the selected access point; employing, when the attempt to connect to the selected access point is not successful, at the communication terminal main body the response command to update an access experience information item, from among the plurality of access experience information items, that corresponds to the selected access point; and employing the updated access experience information to again select an access point currently assumed to be that one which is most accessible.

According to an additional aspect of the present invention, a method that is performed by a communication terminal, which includes means for storing address information for a plurality of access points and for generating access commands for connection of the plurality of access points, comprises the steps of: selecting an access point currently that one which is most accessible, based on first access experience information concerning connection to a first access point and second access experience information concerning connection to a second access point; and generating an access command to connect to the selected access point.

According to a further aspect of the present invention, a method that is performed by a communication terminal, which has means for storing address information for a first and a second access point and for generating a first and a second access command to connect to the first and the second access point, comprises the steps of: generating the first access command based on address information for the first access point; determining whether or not an attempt to connect to the first access point by using the first access command, to access the first access point, is successful; storing, when the attempt to connect to the first access point is successful, information to that effect in correlation with an address of the first access point; storing, when the attempt to connect to the first access point is not successful, information to that effect in correlation with an address of the first access point; generating the second access command based on address information for the second access point; determining whether or not an attempt to connect to the second access point by using the second access command, to access the second access point, is successful; storing, when the attempt to connect to the second access point is successful, information to that effect in correlation with an address of the second access point; and storing, when the attempt to connect to the second access point is not successful, information to that effect in correlation with an address of the second access point.

According to still another aspect of the present invention, a communication terminal, which includes a modem for dialing and a terminal main body for generating a dialing command to selectively access one of a plurality of access points on a network, comprises: a storage device for storing a plurality of access experience information items corresponding to the plurality of access points; means for selecting, based on the plurality of access experience information items, an access point currently assumed to be that one which is most accessible; means for generating a dialing command for the selected access point; means for transmitting the dialing command to the modem; means, for receiving the dialing command and dialing the selected access point, the modem having in addition means for generating a response command upon receipt of a response signal from the selected access point and for transmitting the response command to the communication terminal main body; means for receiving the response command; means for determining, based on the response command, whether or not an attempt to connect to the selected access point is successful; means for employing, when the attempt to connect to the selected access point is successful, the response command at the communication terminal main body to update an access experience information item, from among the plurality of access experience information items, that corresponds to the selected access point; means for establishing communication with the selected access point; and means for employing, when the attempt to connect to the selected access point is not successful, the response command at the communication terminal main body to update an access experience information item, from among the plurality of access experience information items, that corresponds to the selected access point.

According to a still further aspect of the present invention, a communication terminal, which includes a storage device for storing address information for a plurality of access points, which has a function for generating access commands to access the plurality of access points and for transmitting the access commands to a modem, and which has a function for receiving from the modem response commands that indicate whether or not connection attempts corresponding to the access commands are successful, comprises: the storage device for storing a plurality of access experience information items corresponding to a plurality of access points; means for employing the plurality of access experience information items to select an access point currently assumed to be that one which is most accessible; means for generating a dialing command from the address information for the selected access point, and for transmitting the dial command to the modem; means for receiving a response command from the modem; means for determining, based on the response command, whether or not an attempt to connect to the selected access point is successful; means for employing, when the attempt to connect to the selected access point is successful, at the communication terminal main body, the response command to update an access experience information item, from among the plurality of access experience information items, that corresponds to the selected access point; means for establishing communication with the selected access point; means for employing, when the attempt to connect to the selected access point is not successful, at the communication terminal main body the response command to update an access experience information item, from among the plurality of access experience information items, that corresponds to the selected access point; and means for employing the plurality of access experience information items to again select an access point currently assumed to be that one which is most accessible.

According to yet another aspect of the present invention, a communication terminal, which includes a storage device for storing address information for a plurality of access points and means for generating access commands to connect to the plurality of access points, comprises: means for selecting an access point currently that one which is most accessible based on first access experience information concerning connections to a first access point and second access experience information concerning connections to a second access point; and means for generating, based on the address information, an access command to connect to the selected access point.

According to yet one more aspect of the present invention, a communication terminal, which has means for storing address information for a first and a second access point and for generating a first and a second access command to connect to the first and the second access point, comprises: means for generating the first access command based on address information for the first access point; means for determining whether or not an attempt to connect to the first access point by using the first access command, to access the first access point, is successful; means for storing, when the attempt to connect to the first access point is successful, information to that effect in correlation with an address of the first access point; means for storing, when the attempt to connect to the first access point is not successful, information to that effect in correlation with an address of the first access point; means for generating the second access command based on address information for the second access point; means for determining whether or not an attempt to connect to the second access point is successful by using the second access command, to access the second access point, is successful; means for storing, when the attempt to connect to the second access point is successful, information to that effect in correlation with an address of the second access point; and means for storing, when the attempt to connect to the second access point is not successful, information to that effect in correlation with an address of the second access point.

According to yet one further aspect of the present invention, provided is a storage medium in which is stored a communication control program for issuing instructions to a communication terminal, which includes a storage device for storing address information for a plurality of access points and means for generating access commands to connect to the plurality of access points, to connect to one of the plurality of access points, the communication control program comprising: program code means for issuing an instruction to the communication terminal to select, based on first access experience information concerning connections to a first access point and second access experience information concerning connections to a second access point, an access point currently that one which is most accessible; and program code means for issuing an instruction to the communication terminal to generate, based on the address information, an access command to connect to the selected access point.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a flowchart of communication procedure for the present invention.

DETAILED DESCRIPTION OF ILLUSTRATIVE EMBODIMENT

A. Hardware Arrangement

Figure 1:
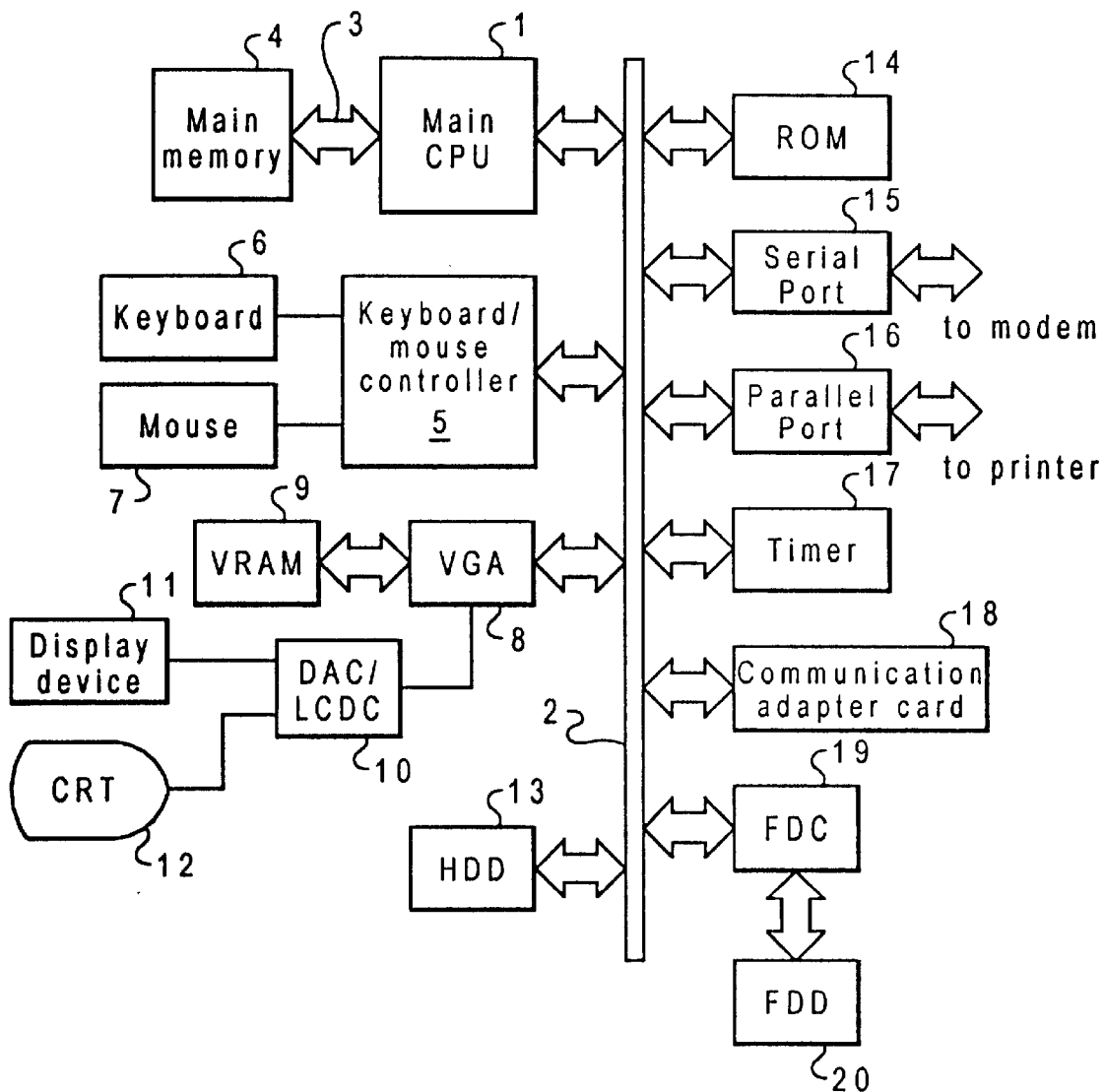
FIG. 1 is a block diagram illustrating a hardware arrangement.

The preferred embodiment of the present invention will now be described while referring to the accompanying drawings. FIG. 1 is a schematic diagram illustrating a hardware arrangement according to the present invention. A system 100 comprises, in part, a central processing unit (main CPU) 1 and a main memory 4. The CPU 1 and the main memory 4 communicate via a bus 2 with a hard disk drive (HDD) 13, which is an auxiliary storage device. A floppy disk drive (FDD) 20 (or an MO or a CD-ROM drive) is connected to the bus via a floppy disk controller (FDC) 19.

A floppy disk (or a recording medium such as an MO disk or a CD-ROM disk) is inserted into the floppy disk drive 20 (or into an MO or CD-ROM drive). Code for a computer program, which in cooperation with an operating system issues commands to the CPU 1, etc., to carry out the present invention, can be recorded on the floppy disk and on the hard disk drive 13, and in a ROM 14. The code is loaded into the memory 4 for execution. The computer program code can be compressed, or can be divided into a plurality of codes segments and recorded using a plurality of media.

The system 100 can be a system that includes user interface hardware. User interface hardware components are, for example, a pointing device (a mouse, a joy stick, etc.) 7 or a keyboard 6 for inputting data, and a display (CRT) 12 for providing a visual data display for a user. A printer, via a parallel port 16, and a modem, via a serial port 15, can be connected to the communication terminal 100, so that it can communicate with another computer via the serial port 15 and the modem, or via a communication adaptor 18. It would therefore be easily understood that the present invention can be provided by employing an ordinary personal computer (PC) or a work station, or a combination of the two. The above described components, however, are merely examples, and not all of them are required for present invention.

A desired operating system for the present invention is, for example, Windows (a trademark of Microsoft Corp.), OS/2 (a trademark of IBM Corp.), or the X-Window system (a trademark of MIT) or AIX (a trademark of IBM Corp.), all of which provide support for a GUI multi-window environment. The present invention, however, can be realized within a character based environment provided by PC-DOS (a trademark of IBM Corp.) or MS-DOS (a trademark of Microsoft Corp.), and is not limited to a specific operating system environment.

B. System Configuration

Figure 2:
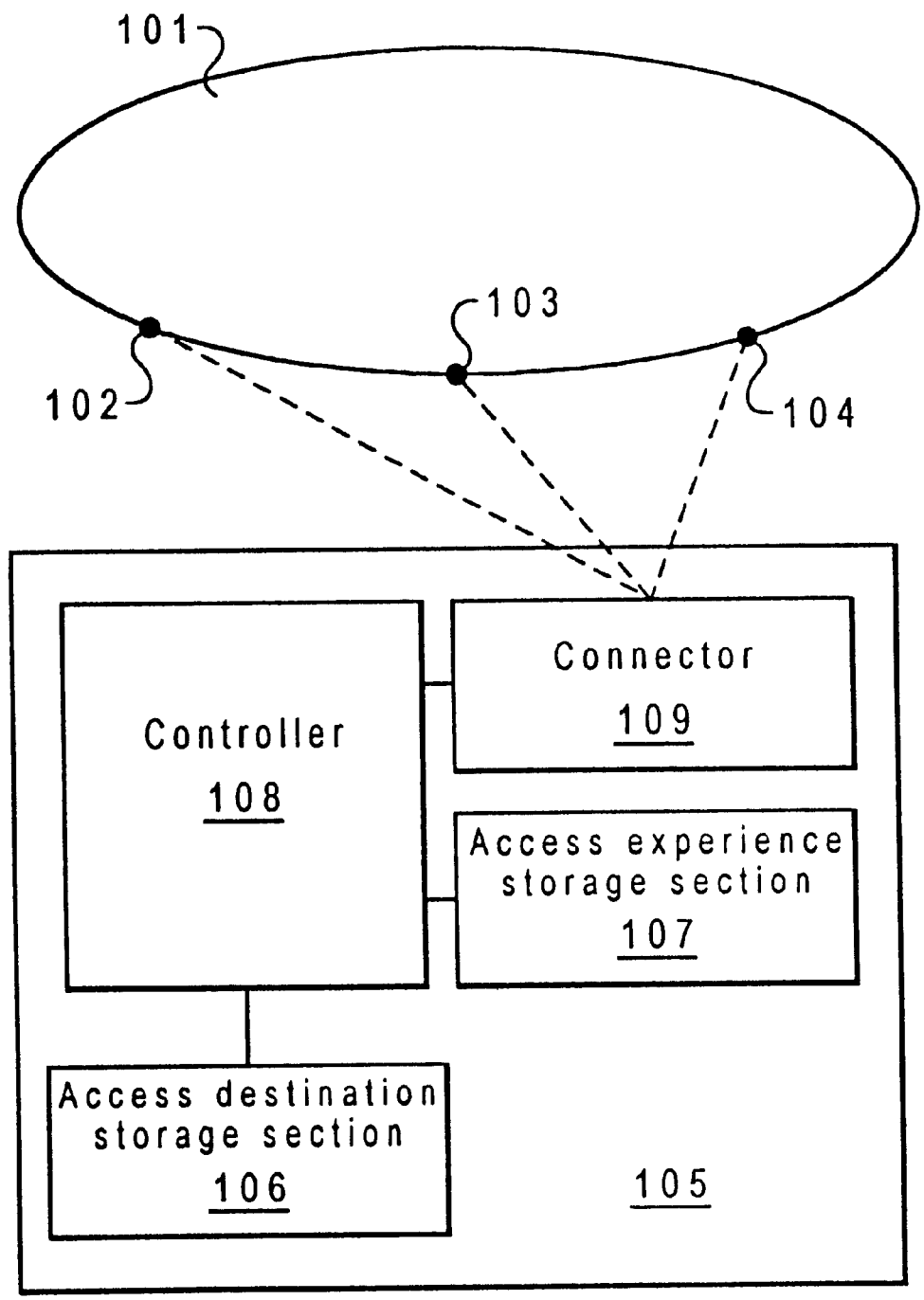
FIG. 2 is a block diagram for processing components.

The system configuration of the present invention will now be explained while referring to the block diagram in FIG. 2. An access destination storage section 106 and an access experience storage section 107, which are represented by individual blocks in FIG. 2, are stored individually or collectively as a data file or a program file in a storage device, such as the hard disk 13 shown in FIG. 1. A controller 108 is stored in the main CPU 1 and a storage medium, such as the hard disk 13 shown in FIG. 1, and can be provided by the execution of a control program loaded into the main memory 4.

The storage media are, for example, a floppy disk, a CD-ROM disk, an MO disk, a PD, or a storage device connected to the network. The program code can be divided into a plurality of code segments, which are stored on a plurality of media, or the program can be compressed and stored on a single recording medium. The recording media are loaded into a system by various drives, such as a floppy disk drive, or by using a modem and a serial port.

A connector 109 receives a dialing command from the controller 108 and transmits the dialing command. In this embodiment, the connector 109 can be a modem that is connected via the serial port 15. The connector is not limited to an ordinary modem that can be connected to the public telephone network; any modem may be employed so long as one of its functions provides for the transmission of destination information for connecting to one of the access points in order to access the network 101. In FIG. 2, the connector 109 can transmit a signal for connecting to an access point 102, 103 or 104. In the preferred embodiment, although the access points 102, 103 and 104 are Internet providers that exist on the network, the access points are not limited to those shown, and may be facsimile devices that exist on the same link or a plurality of communication terminals, such as PCs.

FIG. 3 is a flowchart showing the access procedures for connecting to an access point according to the embodiment of the present invention. The processing is begun by detecting an access request from a user or a system (step 301). First, during a dialing command selection routine of the present invention, which will be described later, an access point currently that one which is most accessible is selected and a dialing command is generated (step 303). Specifically, this process is performed by the cooperation of the controller 108 with the access destination storage section 106 and the access experience storage section 107. Following this, the controller 108 transmits the dialing command to the connector 109 (step 305).

The connector 109 confirms the dialing command received from the controller 108 (step 307), and dials to make a connection with the access point corresponding to the dialing command (step 309). When the attempt to make the connection is not successful, for example, as when a signal indicating "BUSY" is received from the access point or no response signal is received, the connector 109 transmits to the controller 108 a response command indicating there has been a communication connection failure. When a signal is received indicating that there is a confirmed connection, the connector 109 transmits to the controller 108 a response command indicating that the communication connection attempt was successful (step 311).

The controller 108 confirms the receipt of the response command, which was transmitted by the connector 109 (step 313). The controller 108 then examines the contents of the response command to determine whether or not the communication connection attempt was successful (step 315). When the response command indicates the connection attempt was successful, access experience information stored in the access experience information storage section 107, which will be described later, is updated (step 321). The controller 108 acquires the communication by using a well known method (step 323).

When the response command indicates that the connection attempt was not successful, the access experience information, which will be described later, is updated (step 317). A check is then performed to determine whether or not the access attempt should be repeated (step 319). Specifically, for this determination, a count of the dialing events is obtained, and when the count exceeds a predetermined number, no further access attempts are made.

The access experience information and its updating method according to the preferred embodiment of the present invention will now be described. Table 1 shows access experience information that is managed in this embodiment. As is shown in Table 1, a call count, a line connect count, an access point connect count, a server connect count, a dialing event count and a total dialing event count are managed individually for access point A (102), access point B (103), and access point C (104).

TABLE 1

| Call Count | Line Connect | Access Point Connect | Server Connect | Count | Total | |
|---|---|---|---|---|---|---|
| 110 | 96 | 94 | 92 | 1 | 100 | A |
| 240 | 48 | 40 | 36 | 1 | 80 | B |
| 200 | 20 | 18 | 16 | 0 | 40 | C |

In Table 1, the call count is a value that is obtained by adding together the number of rings for all dialing events. For the access point A, a total of 110 rings were accumulated for 100 dialing events (total).

The line connect count is a value that indicates how many times line connect attempts were successful during the past dialing events. For the access point A, the line connect attempts were successful 96 times for 100 dialing events (total). When the public telephone network is used by a modem, a successful line connect condition is one wherein a receiver is answered. When a line is busy, or there is no response to a call within a predetermined number of rings or following a predetermined period time, the line connection is not successful.

The access point connect count is a value that indicates how many times the theoretical connection to the access point was successful. For access point A, the theoretical connection was successful 94 times for 100 dialing events (total). When a modem is used across the public telephone network, a successful access point connect condition is one wherein a receiver answers, and communication with a receiver's modem is established. When a person answers because an incorrect telephone number was dialed, or when a receiver's modem can not for some reason transmit a response, the access point connect is not successful.

The server connect count is a value that indicates how many times desired data held in a receiver's computer has been accessed during the recorded dialing events. For access point A, data access was successful 92 times for 100 dialing events (total). For a dial-up IP connection to a server on the Internet across the public telephone network, a successful data access condition is one wherein the server on the Internet was accessed. When the server can not be accessed because there is something wrong with the server or with the route used to access the server, the connection with the server is not successful.

The "count" value indicates the number of times a connection operation is performed for an access point during a connection processing sequence. The "count" value is initialized at the "start" (step 301) in FIG. 3; the count for each access point being set to zero. When it is ascertained at step 315 which determine whether the access is successful that a connection operation was not successful, the "count" value for the corresponding access point for which the connection operation was not successful is incremented by one (step 317). Table 1 shows a condition wherein connection operations for access point A and access point B have been performed.

When, at step 315 in FIG. 3, the connection operation is not successful, the controller 108 updates the total value in Table 1 by incrementing the value by one (step 317 in FIG. 3). When the connection operation is successful, the controller 108 increments the line connect count and the total value in Table 1 by one to update these values, and increments the call count by the number of the calls that were required to make the connection (step 317 in FIG. 3). At step 323, for establishing the communication in FIG. 3, the controller 108 determines whether or not the connection to the access point and the connection to the server were successful. When they were successful, the access point connect count and the server connect count in Table 1 are increased. In FIG. 3, a redialing process is not performed when the connection to the access point and the connection to the server are not successful. When such a connection operation is not successful, the process at the dialing command selection step 303 and the following steps may be repeated.

TABLE 2

| Call Count | Line Connect | Access Point Connect | Server Connect | Count | |
|---|---|---|---|---|---|
| 1.1 | 0.96 | 0.94 | 0.92 | 1 | A |
| 3.0 | 0.60 | 0.50 | 0.45 | 1 | B |
| 5.0 | 0.50 | 0.45 | 0.40 | 0 | C |

Table 2 shows the average values for the individual counts. For example, the average count at which line connection operations for access point A were successful is 0.96 times. In this embodiment, such access experience information is employed to select an access point currently assumed to be that one which is most accessible. The matter of how it is determined that an access point is selected by using access experience information, such as a line connect count, an access point connect count and a server connect count, can be modified in various ways during the design stage. One of the easiest methods is for the access point connect counts, or their averages, to be numbered, and for the access processing to be repeatedly performed in the order represented by the numbers.

As another replacement idea, by using the count information shown in Tables 1 and 2, for example, the smallest count, and the line connect count, or its average value, that is the smallest are selected, and a corresponding access point is selected as the access point that is the most accessible.

Further, an evaluation value may be acquired for each access point using the following expression, and the access point that has the greatest evaluation value can be determined to be the access point that is the most accessible:

$$\text{Evaluation value} = \text{Access point accessing average value}/(\text{count}+C).$$

In this calculation, an access point connect count can be used instead of the access point connect average value, and a line connect count or a server connect count may be used. C is a constant employed to prevent division by 0.

In addition, when the evaluation value is calculated by taking a calling count into consideration, $$\text{Evaluation value} = \text{Calling count} \cdot \text{Access point connect average value}/(\text{Count}+C)$$

The evaluation may be performed after the evaluation value has been multiplied by a random number.

The average time required until a process has reached an individual access steps, i.e., the time period extending from when a dialing command is generated and transmitted to the modem until a signal is received indicating the process has reached an individual access step, is measured. Such a time period can be used instead of various connection count information items to select an access point currently assumed to be that one which is most accessible.

According to the method for selecting an access point currently assumed to be that one which is most accessible, a mathematical functional expression for calculating evaluation values can be modified in various ways at the design stage. This modification is an easy matter for one having ordinary skill in the art. Although, in this embodiment an access point is switched, a user ID that is used for an access command can be altered.

As is described above, according to the present invention it is ensured that an access point on a network can be quickly accessed using a simple operation.

While the invention has been particularly shown and described with reference to a preferred embodiment, it will be understood by those skilled in the art that various changes in form and detail may be made therein without departing from the spirit and scope of the invention.

What is claimed is:

1. A method for providing efficient access of a communication network to a data processing system, said data processing system including a connector and a memory, said communication network including a plurality of access points, said method comprising the steps of:

storing access experience information and address information corresponding to each of said plurality of access points within said memory;

selecting, at said data processing system, an access point from said plurality of access points utilizing said access experience information;

requesting a connection between said data processing system and said communication network via said selected access point;

determining whether said connection between said data processing system and said communication network via said selected access point has been made;

updating access experience information corresponding to said selected access point, in response to a determination whether said connection between said data processing system and said communication network via said selected access point has been made;

in response to a determination that said connection has been made, transferring data between said data processing system and said communication network: and in response to a determination that said connection has not been made, selecting, at said data processing system, an alternate access point from said plurality of access points utilizing said access experience information.

2. The method as set forth in claim 1, wherein said requesting step comprises the steps of:

generating, within said data processing system, a dialing command utilizing address information corresponding to said selected access point; and transmitting said dialing command to said connector.

3. The method as set forth in to claim 1, wherein said determining step comprises the steps of:

generating, within said connector, a response command upon receipt of a response signal from said communication network; and determining, within said data processing system, whether said connection between said data processing system and said communication network via said selected access point has been made utilizing said response command.

4. A data processing system for providing efficient access to a communication network having a plurality of access points, said data processing system comprising:

means for storing access experience information and address information corresponding to each of said plurality of access points;

means for selecting an access point from said plurality of access points utilizing said access experience information;

means for connecting said data processing system and said communication network utilizing address information corresponding to a selected access point;

means for determining whether a connection between said data processing system and said communication network via a selected access point has been made;

means for updating access experience information corresponding to a selected access point, in response to a determination whether a connection between said data processing system and said communication network via said selected access point has been made; and means for selecting an alternate access point from said plurality of access points utilizing said access experience information in response to a determination that a connection between said data processing system and said communication network via a selected access point has not been made.

5. The data processing system as set forth in claim 4, said means for connecting said data processing system and said communication network comprising:

means for transferring data between said data processing system and said communication network in response to a determination that a connection between said data processing system and said communication network via a selected access point has been made;

means for generating a response command upon receipt of a response signal from said communication network; and means for transmitting said response command to said means for determining whether a connection between said data processing system and said communication network via a selected access point has been made.

6. The data processing system as set forth in claim 5, wherein said determining means comprise:

means for determining whether a connection between said data processing system and said communication network via a selected access point has been made utilizing said response command.

7. A computer program product for providing efficient access of a communication network to a data processing system said data processing system including a connector and a memory, said communication network including a plurality of access points, said computer program product comprising:

a media usable by said data processing system for storing and executing instruction means;

instruction means, embodied within said media, for storing access experience information and address information corresponding to each of said plurality of access points within said memory;

instruction means, embodied within said media, for selecting an access point from said plurality of access points utilizing said access experience information;

instruction means, embodied within said media, for requesting a connection between said data processing system and said communication network via said selected access point;

instruction means, embodied within said media for determining whether said connection between said data processing system and said communication network via said selected access point has been made;

instruction means, embodied within said media, for updating access experience information corresponding to said selected access point, in response to a determination whether said connection between said data processing system and said communication network via said selected access point has been made;

instruction means, embodied within said media, for transferring data between said data processing system and said communication network in response to a determination that said connection has been made; and instruction means, embodied within said media, for selecting an alternate access point from said plurality of access points utilizing said access experience information in response to a determination that said connection has not been made.

8. The computer program product as set forth in claim 7, wherein said instruction means for requesting a connection comprise:

instruction means, embodied within said media, for generating, within said data processing system, a dialing command utilizing address information corresponding to said selected access point; and instruction means, embodied within said media, for transmitting said dialing command to said connector.

9. The computer program product as set forth in claim 7, wherein said instruction means for determining comprise:

instruction means, embodied within said media, for generating, within said connector, a response command upon receipt of a response signal from said communication network; and instruction means, embodied within said media, for determining whether said connection between said data processing system and said communication network via said selected access point has been made utilizing said response command.

* * * * *